US009679129B2

(12) United States Patent
Yoshikawa et al.

(10) Patent No.: US 9,679,129 B2
(45) Date of Patent: Jun. 13, 2017

(54) INFORMATION PROCESSING DEVICE AND INFORMATION PROCESSING METHOD

(71) Applicant: SONY CORPORATION, Tokyo (JP)

(72) Inventors: Kiyoshi Yoshikawa, Saitama (JP); Yoichi Yagasaki, Tokyo (JP); Yasuhisa Nakajima, Kanagawa (JP); Kazuomi Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 179 days.

(21) Appl. No.: 14/461,599

(22) Filed: Aug. 18, 2014

(65) Prior Publication Data

US 2015/0062356 A1    Mar. 5, 2015

(30) Foreign Application Priority Data

Aug. 28, 2013   (JP) ................................. 2013-177031

(51) Int. Cl.
*H04N 5/228* (2006.01)
*G06F 21/44* (2013.01)

(52) U.S. Cl.
CPC ................................. *G06F 21/445* (2013.01)

(58) Field of Classification Search
CPC ........... H04N 5/23251; H04N 5/23254; H04N 21/25875; G06F 21/445

USPC ....................................................... 348/222.1
See application file for complete search history.

(56) References Cited

U.S. PATENT DOCUMENTS

| 8,792,862 B1* | 7/2014 | Juels ..................... H04W 12/06 455/411 |
| 2009/0202223 A1* | 8/2009 | Saito ......................... H04N 7/15 386/353 |
| 2014/0082713 A1* | 3/2014 | Markel .................... H04L 63/08 726/7 |

FOREIGN PATENT DOCUMENTS

JP     2010-231450 A     10/2010

* cited by examiner

*Primary Examiner* — Yogesh Aggarwal
(74) *Attorney, Agent, or Firm* — Chip Law Group

(57) ABSTRACT

There is provided an information processing device including a first motion body that is a target for imaging performed by another information processing device, a detection unit configured to detect motion of the first motion body, and an authentication unit configured to decide whether to authenticate the another information processing device on the basis of a motion state of the first motion body that has been estimated by the another information processing device on the basis of a captured image acquired through the imaging and a motion state of the first motion body that has been detected by the detection unit.

16 Claims, 13 Drawing Sheets

INFORMATION PROCESSING DEVICE AND INFORMATION PROCESSING METHOD

CROSS REFERENCE TO RELATED APPLICATIONS

This application claims the benefit of Japanese Priority Patent Application JP 2013-177031 filed Aug. 28, 2013, the entire contents of which are incorporated herein by reference.

BACKGROUND

The present disclosure relates to an information processing device and an information processing method.

JP 2010-231450A discloses an imaging-data authentication device. The imaging-data authentication device requests second imaging data from an information processing device in a case of receiving first imaging data from the information processing device. Subsequently, the imaging-data authentication device authenticates the information processing device on the basis of a correspondence relation between the first imaging data and the second imaging data.

SUMMARY

Recently, there has been a need for connecting an information processing device that a user operates with an information processing device that is within view of the user more easily. However, the technology disclosed in JP 2010-231450A does not respond to the need.

The present disclosure proposes an information processing device and information processing method that can connect more easily with an information processing device within view of a user.

According to an embodiment of the present disclosure, there is provided an information processing device including a first motion body that is a target for imaging performed by another information processing device, a detection unit configured to detect motion of the first motion body, and an authentication unit configured to decide whether to authenticate the another information processing device on the basis of a motion state of the first motion body that has been estimated by the another information processing device on the basis of a captured image acquired through the imaging and a motion state of the first motion body that has been detected by the detection unit.

According to an embodiment of the present disclosure, there is provided an information processing device including an imaging unit configured to image a second motion body included in the another information processing device, an estimation unit configured to estimate a motion state of the second motion body on the basis of the captured image acquired by the imaging unit through the imaging, and an authentication unit configured to perform control in a manner that motion estimation information is transmitted to the another information processing device, the motion estimation information relating to the motion state of the second motion body estimated by the estimation unit.

According to an embodiment of the present disclosure, there is provided an information processing method including detecting motion of a first motion body that is a target for imaging performed by another information processing device, and deciding whether to authenticate the another information processing device on the basis of a motion state of the first motion body that has been estimated by the another information processing device on the basis of a captured image acquired through the imaging and a detected motion state of the first motion body.

According to an embodiment of the present disclosure, there is provided an information processing method including imaging a second motion body included in the another information processing device, estimating a motion state of the second motion body on the basis of the captured image acquired through the imaging, and performing control in a manner that motion estimation information is transmitted to the another information processing device, the motion estimation information relating to the estimated motion state of the second motion body.

According to one or more of embodiments of the present disclosure, an information processing device decides whether to authenticate another information processing device on the basis of a motion state of a first motion body that has been estimated by the another information processing device on the basis of a captured image acquired through the imaging and a motion state of the first motion body that has been detected by a detection unit. Here, since the another information processing device images the first motion body, a user of the information processing device can visually recognize the another information processing device. Accordingly, the information processing device can connect more easily with an information processing device within view of the user.

As explained above, according to embodiments of the present disclosure, it is possible to connect more easily with an information processing device within view of a user. Note that effects of the present disclosure are not limited to the effect stated here. The technology according to the embodiments of the present disclosure may achieve any of the effects indicated in this specification or other effects.

DETAILED DESCRIPTION OF THE EMBODIMENT(S)

Figure 1:
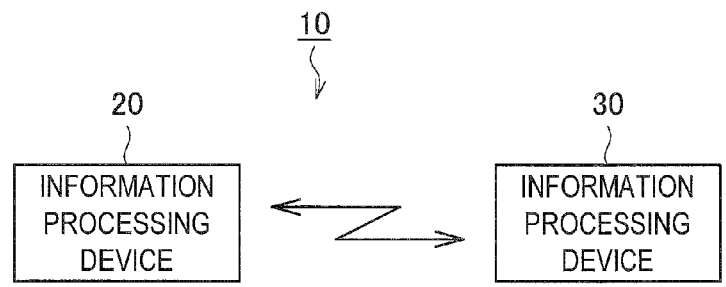
FIG. 1 is a block diagram showing an overall configuration of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order:
1. First Embodiment (Combination of Surveillance Camera and Wearable Device)
1-1. Overall Configuration
1-2. Outline of Processing Performed in Information Processing System
1-3. Detailed Configuration of Information Processing Device (Wearable Device)
1-4. Detailed Configuration of Information Processing Device (Surveillance Camera)
1-5. Procedure of Processing Performed in Information Processing System
1-5-1. Procedure of Processing Performed by Information Processing Device (Wearable Device)
1-5-2. Procedure of Processing Performed by Information Processing Device (Surveillance Camera)
1-6. Modification of Processing Performed in Information Processing System
1-6-1. Procedure of Processing Performed by Information Processing Device (Wearable Device)
1-6-2. Procedure of Processing Performed by Information Processing Device (Surveillance Camera)
2. Second Embodiment (Combination of Wearable Device and Wearable Device)
2-1. Overall Configuration
2-2. Detailed Configuration of Information Processing Device (Wearable Device)
2-3. Procedure of Processing Performed in Information Processing System
2-3-1. Procedure of Processing Performed by Information Processing Device (One Wearable Device)
2-3-2. Procedure of Processing Performed by Information Processing Device (Another Wearable Device)

<1. First Embodiment(Combination of Surveillance Camera and Wearable Device)>

(1-1. Overall Configuration)

First, with reference to FIGS. 1 and 2, an overall configuration of an information processing system 10 according to a first embodiment will be explained.

As shown in FIG. 1, the information processing system 10 includes information processing devices 20 and 30. As shown in FIG. 2, in the first embodiment, the information processing device 20 is a so-called head-mounted wearable device, and the information processing device 30 is a so-called surveillance camera. Needless to say, the information processing devices 20 and 30 are not limited thereto. Other examples of the information processing devices 20 and 30 will be described later.

Figure 4:
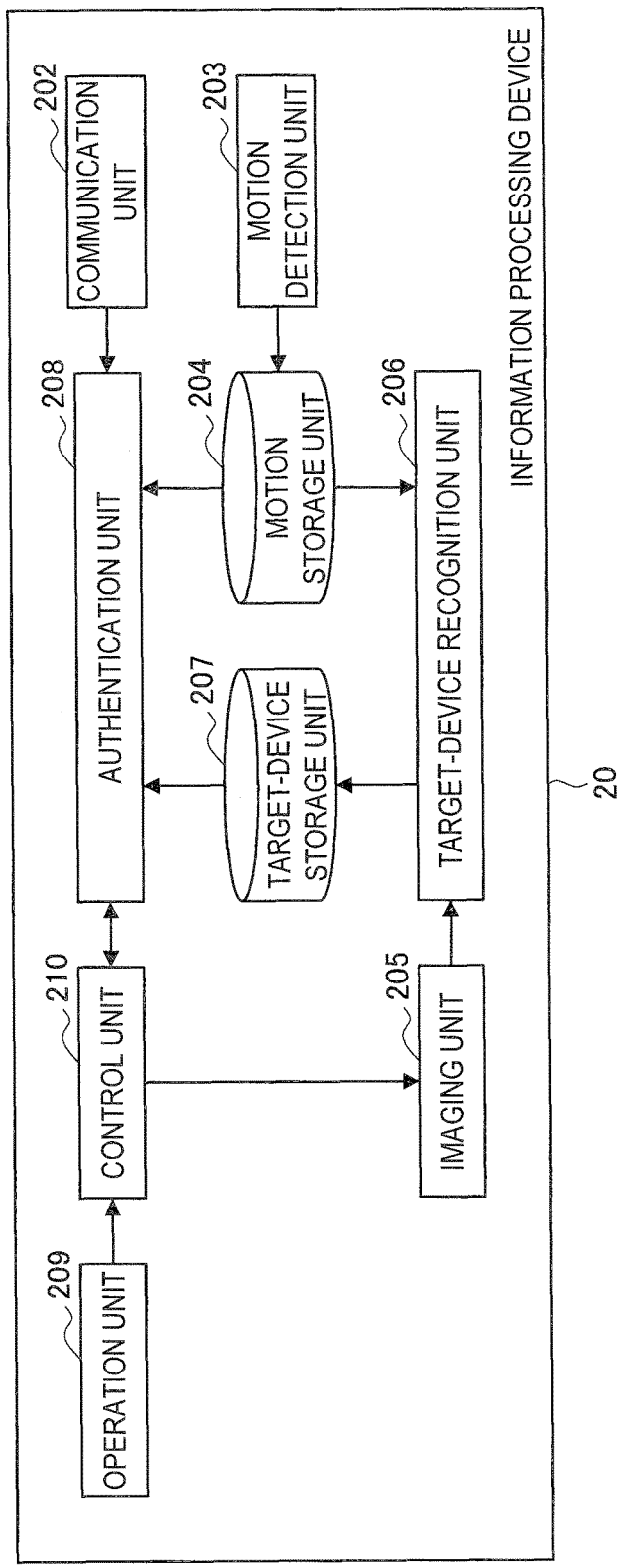
FIG. 4 is a block diagram showing a configuration of an information processing device.
Figure 5:
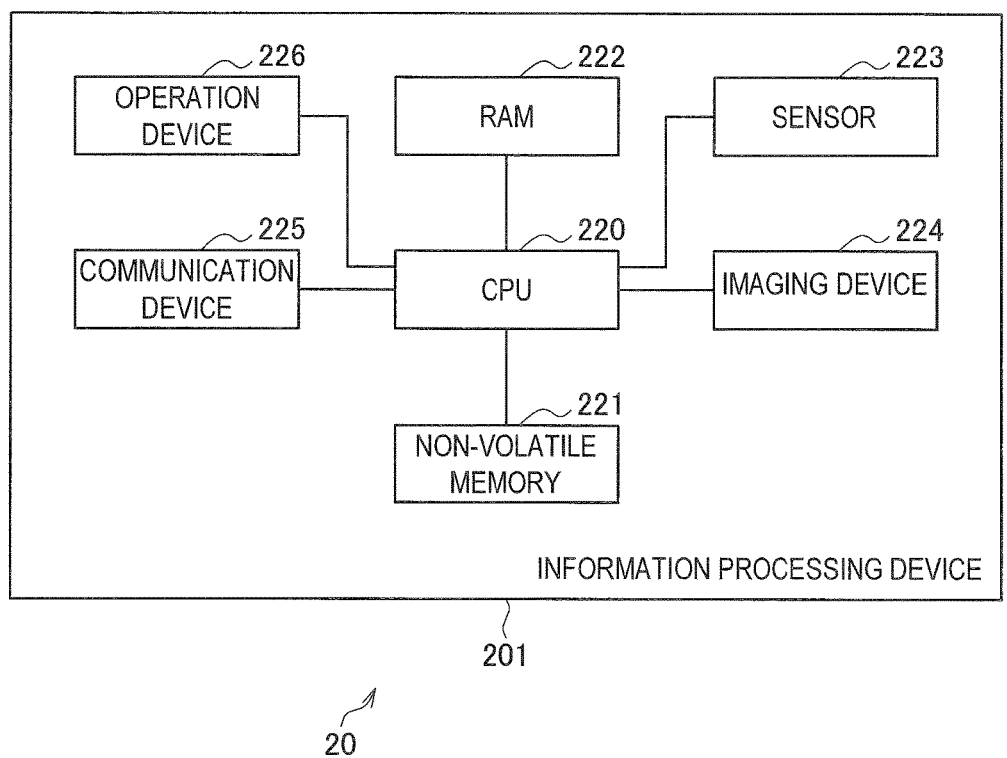
FIG. 5 is a block diagram showing a hardware configuration of an information processing device.

The information processing device 20 includes an exterior body 201 (first motion body and second motion body) and an imaging unit 205 (imaging device 224) built in the exterior body 201 (see FIGS. 4 and 5). The exterior body 201 moves together with a head of a user A wearing the information processing device 20. For example, in a case where the user A moves (that is, nods) his neck in a direction of an arrow a, the exterior body 201 also moves in the direction of the arrow a. The imaging unit 205 is built in the exterior body 201, and an optical axis of the imaging unit 205 moves together with the exterior body 201. In addition, the imaging unit 205 images an object in front of the user A, that is, within view of the user. For example, when the user A is visually recognizing the information processing device 30 which is a surveillance camera, the imaging unit 205 images the information processing device 30.

The information processing device 30 includes a motion body (first motion body and second motion body) 310 and the imaging unit 304 (imaging device 324) built in the motion body 310. The motion body 310 is a substantially-spherical rotating body that can randomly rotate in directions of arrows B and C, and the imaging unit 304 rotates together with the motion body 310. That is, an optical axis of the imaging unit 304 rotates in the directions of the arrows B and C together with the motion body 310. The imaging unit 304 images an object in front of an optical-axis direction. For example, in a case where the exterior body 201 of the information processing device 20 exists in front of the optical-axis direction, the imaging unit 304 images the exterior body 201.

(1-2. Outline of Processing Performed in Information Processing System)

Figure 3:
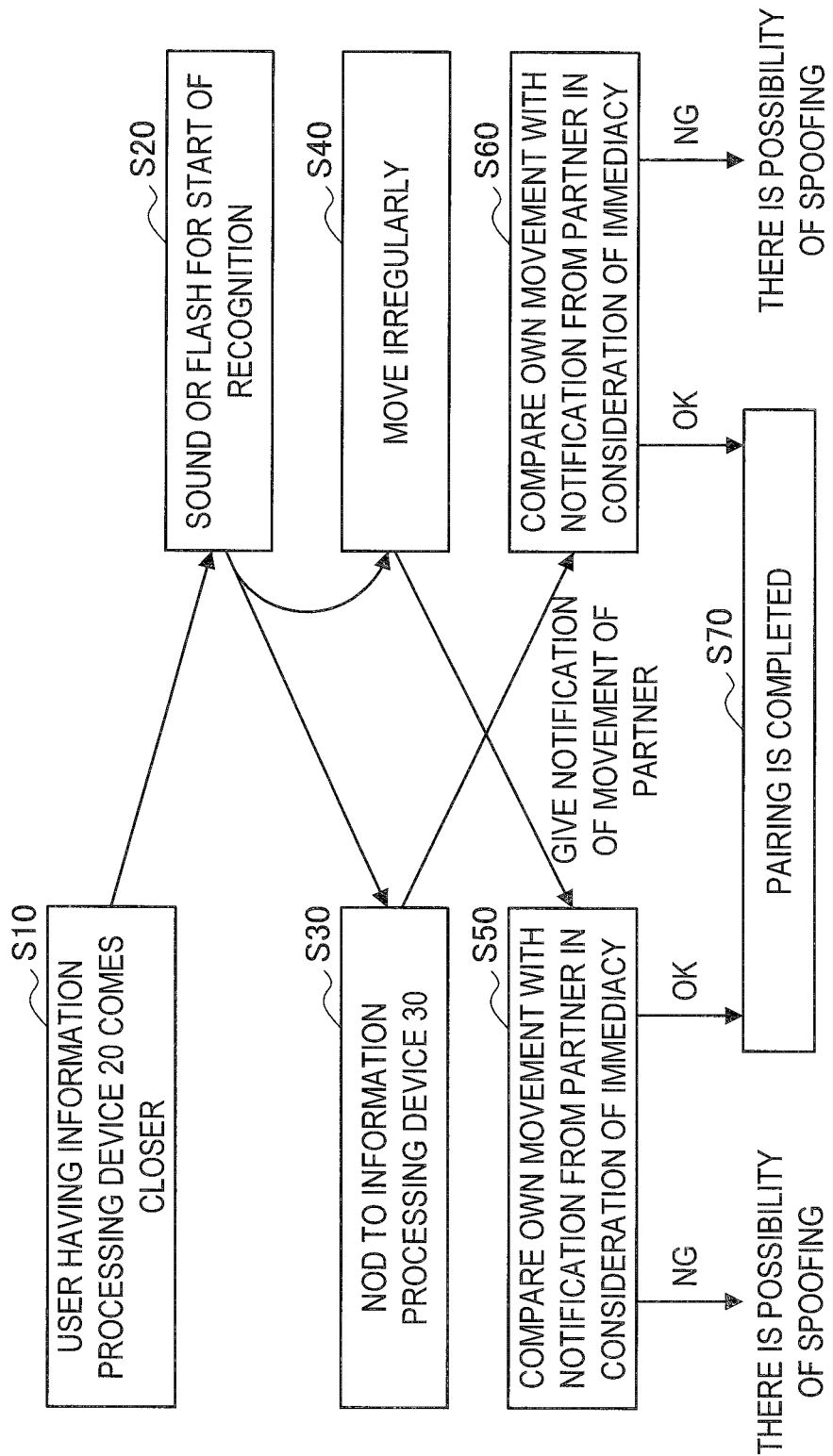
FIG. 3 is a flowchart showing an outline of processing performed in an information processing system.

Next, with reference to a flowchart in FIG. 3, an outline of processing performed in the information processing system 10 will be explained.

In step S10, the user A wearing the information processing device 20 comes close to the information processing device 30 in order to request the information processing device 30 to perform authentication.

In step S20, in a case where the imaging unit 304 images the information processing device 20, the information processing device 30 outputs sound or flash to inform the user A of a start of the recognition.

In step S30, the user A nods to the information processing device 30. For example, the user A nods in the direction of the arrow a in FIG. 2. The exterior body 201 moves together with the head of the user A. On the other hand, the information processing device 20 detects motion of the exterior body 201 and stores motion detection information about the detection result. In addition, the imaging unit 205 of the information processing device 20 acquires a captured image by imaging the motion body 310 (in other words, imaging unit 304). On the basis of the captured image, the information processing device 20 estimates motion of the motion body 310. The information processing device 20 transmits (notifies) motion estimation information about the estimation result to the information processing device 30.

While the processing in step S30 is performed, the information processing device 30 randomly (irregularly) moves the motion body 310 in the directions of the arrows B and C in step S40. In addition, the information processing device 30 detects motion of the motion body 310 and stores motion detection information about the detection result. In addition, the imaging unit 304 of the information processing device 30 acquires a captured image by imaging the exterior body 201. On the basis of the captured image, the information processing device 30 estimates motion of the exterior body 201 (in other words, the imaging unit 205). Note that, as described above, the exterior body 201 moves together with the head of the user A. The information processing device 30 transmits (notifies) motion estimation information about the estimation result to the information processing device 20.

In step S50, the information processing device 20 compares its own movement with a notification from a partner in consideration of immediacy. Specifically, the information processing device 20 compares the motion estimation information transmitted from the information processing device 30 with the movement detection information stored in the information processing device 20, and determines whether the both are consistent with each other.

On the other hand, in step S60, the information processing device 30 compares its own movement with a notification from a partner in consideration of immediacy. Specifically, the information processing device 30 compares the motion estimation information transmitted from the information processing device 20 with the movement detection information stored in the information processing device 30, and determines whether the both are consistent with each other.

In a case where the motion detection information and the motion estimation information are consistent with each other in both of steps S50 and S60, the information processing devices 20 and 30 complete pairing. Subsequently, the information processing devices 20 and 30 perform processing such as establishment of a communication path. On the other hand, in a case where the motion detection information and the motion estimation information are not consistent with each other in any one of steps S50 and S60, the information processing system 10 stops pairing since it is determined that any one of the information processing devices 20 and 30 is spoofed by others.

As described above, in the first embodiment, not only the information processing device 30 which have received a request for authentication but also the information processing device 20 which has requested the authentication authenticate its partner. Accordingly, in a case where the information processing device 30 which has received the authentication request is spoofed by others, the information processing device 20 can stop pairing with the information processing device 30. Accordingly, security is improved. Moreover, the user A can connect (pair) the information processing device 20 operated by the user A with the information processing device 30 within view of the user A more easily.

(1-3. Detailed Configuration of Information Processing Device (Wearable Device))

Next, with reference to FIGS. 2, 4, and 5, a detailed configuration of the information processing device 20 will be explained. As shown in FIG. 2, the information processing device 20 is a so-called wearable device. However, needless to say, the information processing device 20 is not limited to the wearable device. That is, the information processing device 20 is not specifically limited as long as the information processing device 20 can achieve functions in FIG. 4 and the information processing device 20 has a motion body that moves in conjunction with movement of a user. However, when convenience of a user is considered, it is preferable for the information processing device 20 to be able to be carried by the user. Examples of the information processing device 20 which can be carried by a user are a smartphone, a smartwatch, a shoe sensor, a mobile phone, and a smart tablet, in addition to the wearable device. In a case where the information processing device 20 is a smartphone, a smartwatch, a shoe sensor, a mobile phone, or a smart tablet, exterior bodies of such devices serve as motion bodies.

Figure 2:
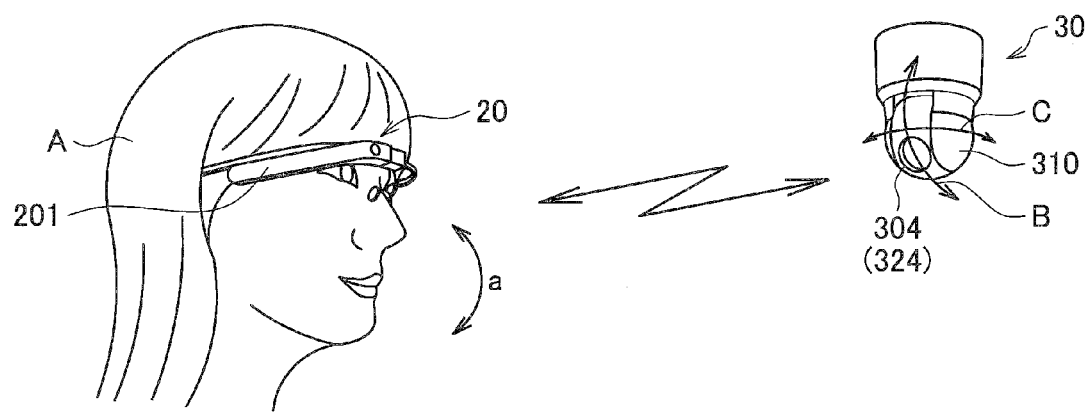
FIG. 2 is an explanatory diagram showing appearance of the information processing system according to the first embodiment.

As shown in FIGS. 2 and 4, the information processing device 20 includes an exterior body 201, a communication unit 202, a motion detection unit (detection unit) 203, a motion storage unit 204, a imaging unit 205, a target-device recognition unit (estimation unit) 206, a target-device storage unit 207, an authentication unit 208, and an operation unit 209, and a control unit 210.

The communication unit 202 builds a communication network (for example, personal area network (PAN)) and performs diverse communications between information processing devices in the communication network. For example, the communication unit 202 finds the information processing device 30 in the communication network, exchanges diverse pieces of authentication information (for example, later-described motion estimation information) with the information processing device 30, and after pairing is completed, performs data communication with the information processing device 30.

Here, an example of a method by which the communication unit 202 finds the information processing device 30 includes the following method. That is, the communication unit 202 prestores identification information of the information processing device 30, and requests the identification information from an information processing device in the communication network. Subsequently, the communication unit 202 searches pieces of identification information returned from respective information processing devices for the identification information of the information processing device 30. In a case where there is the identification information of the information processing device 30, the communication unit 202 determines that the information processing device 30 is in the communication network. That is, the communication unit 202 finds the information processing device 30.

The motion detection unit 203 detects movement (motion state) of the exterior body 201 (in other words, an optical axis of the imaging unit 205) and causes the motion storage unit 204 to store detection-result information about the detection result. The motion storage unit 204 stores motion detection information given by the motion detection unit 203. Specific contents of the motion detection information are not limited. For example, the specific contents may indicate a movement locus of an arbitrary point on the exterior body 201.

The imaging unit 205 generates a captured image by imaging an object within view of the user A wearing the information processing device 20, and outputs to the target-device recognition unit 206.

On the basis of the captured image, the target-device recognition unit 206 recognizes the information processing device 30. For example, the recognition is performed as described below. That is, a template image in which appearance of the information processing device 30 is drawn is stored in the target-device storage unit 207. Next, the target-device recognition unit 206 recognizes the information processing device 30 by comparing the template image with respective object images in the captured image. The target-device recognition unit 206 causes the target-device storage unit 207 to store recognition-result information about the recognition result. Note that, it is also possible for the target-device recognition unit 206 to estimate an object image drawn in the center of the captured image to be the information processing device 30. The same applies to later-explained other target-device recognition units.

In addition, on the basis of the captured image, the target-device recognition unit 206 estimates motion (motion state) of the motion body 310 (in other words, movement of an optical axis of the imaging unit 304). Here, when the imaging unit 205 performs imaging, the exterior body 201, that is, the imaging unit 205 is moving. Accordingly, the target-device recognition unit 206 estimates the motion of the motion body 310 in consideration of motion of the imaging unit 205. The target-device recognition unit 206 may estimate motion (that is, motion of optical axis) of the imaging unit 304 instead of the motion body 310. The target-device recognition unit 206 causes the target-device storage unit 207 to store motion estimation information about the estimation result. The target-device storage unit 207 stores recognition result information and the motion estimation information. Specific contents of the motion estimation information are not limited. For example, the specific contents may indicate a movement locus of an arbitrary point on the motion body 310.

The authentication unit 208 performs processing to authenticate the information processing device 30. Specifically, the authentication unit 208 decides whether to authenticate the information processing device 30 on the basis of the motion estimation information given by the information processing device 30 and the motion detection information stored in the motion storage unit 204. Specifically, the authentication unit 208 authenticates the information processing device 30 in a case where such pieces of information are consistent with each other. The authentication unit 208 outputs the motion estimation information stored in the target-device storage unit 207 to the communication unit 202. The communication unit 202 transmits the motion estimation information to the information processing device 30.

The operation unit 209 receives input operation performed by the user, and outputs operation information about operation contents to the control unit 210. In addition to controlling the whole information processing device 20, the control unit 210 decides operation contents (for example, operation contents in the information processing device 30) to be allowed to the user, controls motion of the imaging unit 205, and the like.

The information processing device 20 has a hardware configuration shown in FIG. 5. The hardware configuration achieves the above-described communication unit 202, motion detection unit 203, motion storage unit 204, imaging unit 205, target-device recognition unit 206, target-device storage unit 207, authentication unit 208, operation unit 209, and control unit 210.

As the hardware configuration, the information processing device 20 includes an exterior body 201, a CPU 220, non-volatile memory 221, RAM 222, a sensor 223, an imaging device 224, a communication device 225, and an operation device 226. The CPU 220, the non-volatile memory 221, the RAM 222, the sensor 223, the imaging device 224, the communication device 225, and the operation device 226 are built in the exterior body 201.

The CPU 220 reads and executes a program stored in the non-volatile memory 221. The program includes a program for causing the information processing device 20 to achieve the communication unit 202, the motion detection unit 203, the motion storage unit 204, the imaging unit 205, the target-device recognition unit 206, the target-device storage unit 207, the authentication unit 208, the operation unit 209, and the control unit 210. Accordingly, the CPU 220 reads and executes the program stored in the non-volatile memory 221, and thereby such functions described above are achieved. That is, the communication unit 202, the motion detection unit 203, the motion storage unit 204, the imaging unit 205, the target-device recognition unit 206, the target-device storage unit 207, the authentication unit 208, the operation unit 209, and the control unit 210 are achieved. The CPU 220 may be a substantive operator of the information processing device 20.

The non-volatile memory 221 stores divers programs, image information, and the like. The image information includes the above-described template image. The RAM 222 is a workspace for the CPU 220. The sensor 223 is a sensor for detecting motion of the exterior body 201 (in other words, movement of an optical axis of the imaging device 224). For example, the sensor 223 may be a triaxial acceleration sensor. The imaging device 224 images an object existing in front of an optical-axis direction, that is, the object within view of the user A. Note that, the front of the optical-axis direction means a direction from an image sensor toward a lens. The communication device 225 communicates with the information processing device 30. The operation device 226 is a touch sensor, for example, and outputs operation information corresponding to input operation to the CPU 220.

(1-4. Detailed Configuration of Information Processing Device (Surveillance Camera))

Next, with reference to FIGS. 2, 6, and 7, a detailed configuration of the information processing device 30 will be explained. As shown in FIG. 2, the information processing device 30 is a so-called surveillance camera. However, needless to say, the information processing device 30 is not limited to the surveillance camera. That is, the information processing device 30 is not specifically limited as long as the information processing device 30 can achieve functions shown in FIG. 6. However, in the first embodiment, it is preferable for the information processing device 30 to be placed at a position where it is difficult for the user A to reach his hand for. In this case, the information processing device 20 has to communicate with the information processing device 30 in order to be paired with the information processing device 30. This is because it is highly possible that the spoofing causes information to be leaked out.

In the following explanation, the imaging unit 304 is built in the motion body 310. However, the imaging unit 304 and the motion body 310 may be separate. That is, it is also possible that the imaging unit 304 is fixed on the information processing device 30 and only the motion body 310 is to be moved.

In a way similar to the information processing device 20, the information processing device 30 may be a wearable device or the like. An example where the information processing device 30 is the wearable device will be explained in a second embodiment.

Figure 6:
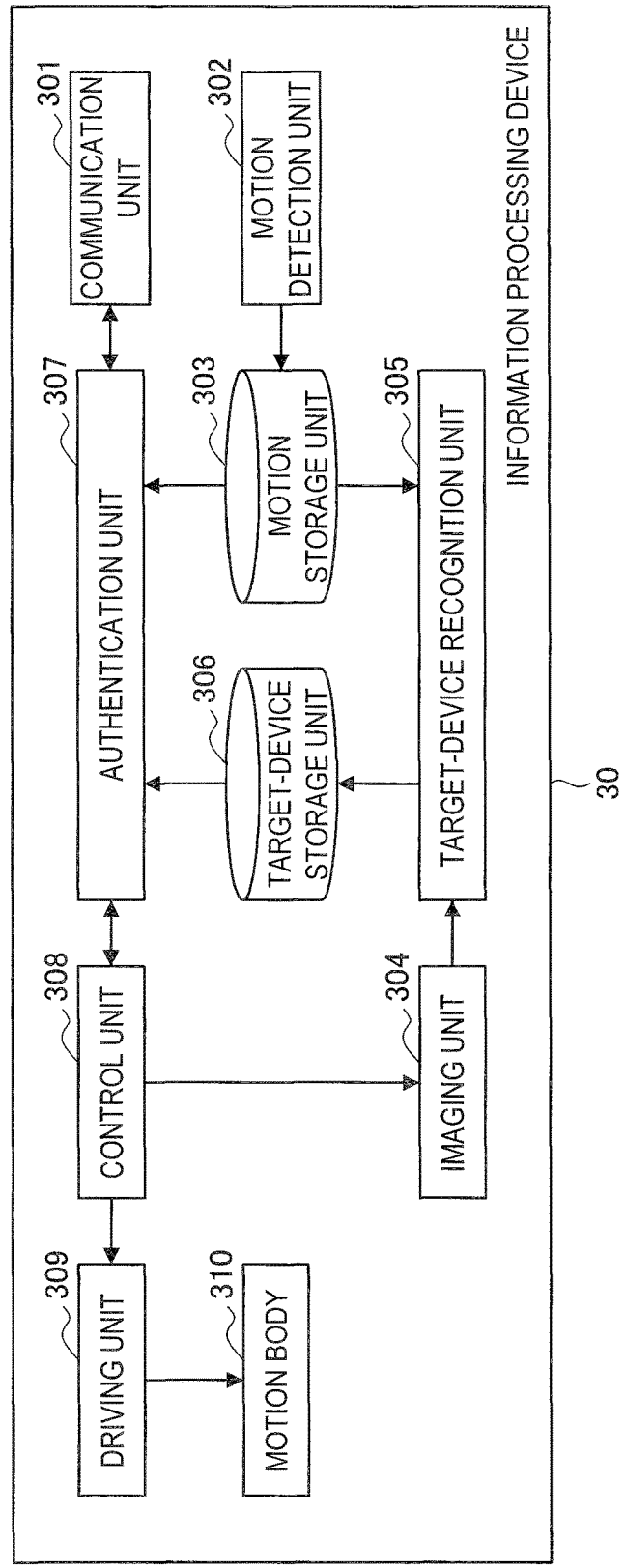
FIG. 6 is a block diagram showing a configuration of an information processing device.

As shown in FIGS. 2 and 6, the information processing device 30 includes a communication unit 301, a motion detection unit 302, a motion storage unit 303, an imaging unit 304, a target-device recognition unit 305, a target-device storage unit 306, an authentication unit 307, a control unit 308, a driving unit 309, and a motion body 310.

The communication unit 301 builds a communication network (for example, personal area network (PAN)) and performs diverse communications between information processing devices in the communication network. For example, the communication unit 301 finds the information processing device 20 in the communication network, exchanges diverse pieces of authentication information (for example, later-described motion estimation information) with the information processing device 20, and after pairing is completed, performs data communication with the information processing device 20. The communication unit 301 finds the information processing device 20 in a way similar to the case of the communication unit 202.

The motion detection unit 302 detects movement (motion state) of the motion body 310 (in other words, an optical axis of the imaging unit 304) and causes the motion storage unit 303 to store detection-result information about the detection result. The motion storage unit 303 stores motion detection information given by the motion detection unit 302. Specific contents of the motion detection information are not limited. For example, the specific contents may indicate a movement locus of an arbitrary point on the motion body 310.

The imaging unit 304 generates a captured image by imaging an object (for example, information processing device 20) existing in front of an optical-axis direction, and outputs to the target-device recognition unit 305.

On the basis of the captured image, the target-device recognition unit 305 recognizes the information processing device 20. For example, the recognition is performed as described below. That is, a template image in which appearance of the information processing device 20 is drawn is stored in the target-device storage unit 306. Next, the target-device recognition unit 305 recognizes the information processing device 20 by comparing the template image with respective object images in the captured image. The target-device recognition unit 305 causes the target-device storage unit 306 to store recognition-result information about the recognition result.

In addition, on the basis of the captured image, the target-device recognition unit 305 estimates motion (motion state) of the exterior body 201 (in other words, movement of an optical axis of the imaging unit 205). Here, when the imaging unit 304 performs imaging, the motion body 310, that is, the imaging unit 304 is moving. Accordingly, the target-device recognition unit 305 estimates the motion of the exterior body 201 in consideration of motion of the imaging unit 304. The target-device recognition unit 305 may estimate motion (that is, motion of optical axis) of the imaging unit 205 instead of the exterior body 201. The target-device recognition unit 305 causes the target-device storage unit 306 to store motion estimation information about the estimation result. The target-device storage unit 306 stores recognition result information and the motion estimation information. Specific contents of the motion estimation information are not limited. For example, the specific contents may indicate a movement locus of an arbitrary point on the exterior body 201.

The authentication unit 307 performs processing to authenticate the information processing device 20. Specifically, the authentication unit 307 decides whether to authenticate the information processing device 20 on the basis of the motion estimation information given by the information processing device 20 and the motion detection information stored in the motion storage unit 303. Specifically, the authentication unit 307 authenticates the information processing device 20 in a case where such pieces of information are consistent with each other. The authentication unit 307 outputs authentication-result information about the authentication result and the motion estimation information stored in the target-device storage unit 207 to the communication unit 301. The communication unit 301 transmits the authentication-result information and the motion estimation information to the information processing device 20.

In addition to controlling the whole information processing device 30, the control unit 308 controls motion of the imaging unit 304, the driving unit 309, and the like. The driving unit 309 causes the motion body 310 to be driven. The motion body 310 is substantially spherical, and is rotatably held by the information processing device 30. As shown in FIG. 2, the motion body 310 is rotatable in the directions of the allows B and C. In addition, the imaging unit 304 (imaging device 324) is built in the motion body 310. Accordingly, the optical axis of the imaging unit 304 (imaging device 324) rotates together with the motion body 310.

Figure 7:
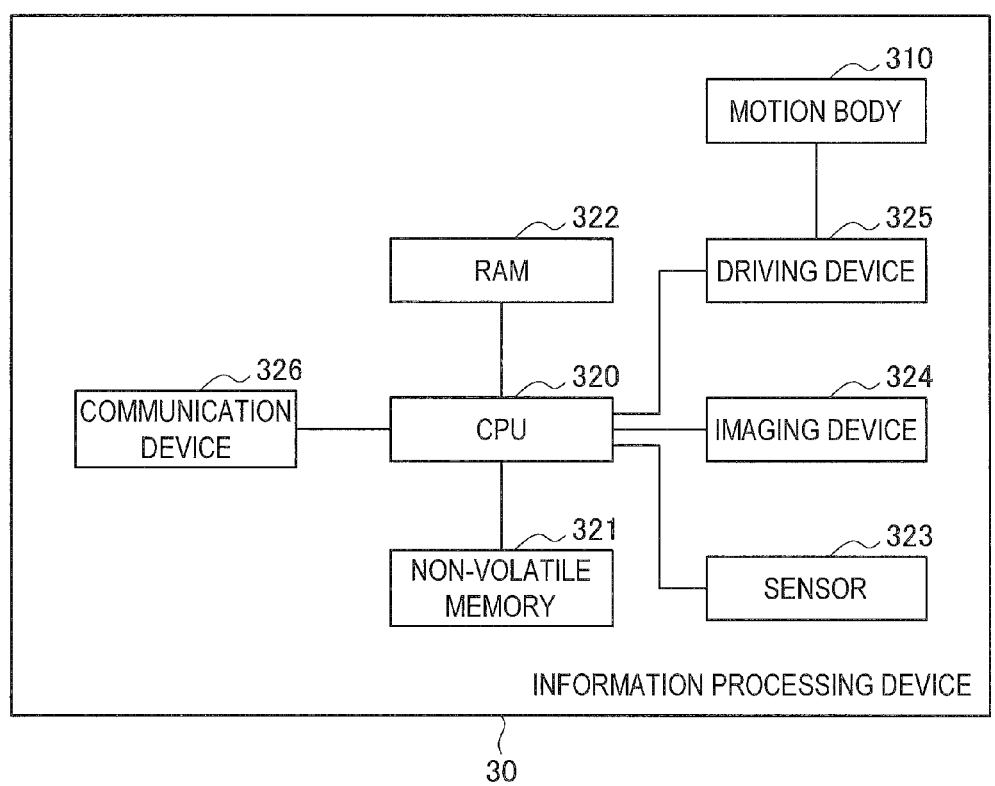
FIG. 7 is a block diagram showing a hardware configuration of an information processing device.

The information processing device 30 has a hardware configuration shown in FIG. 7. The hardware configuration achieves the above-described communication unit 301, motion detection unit 302, motion storage unit 303, imaging unit 304, target-device recognition unit 305, target-device storage unit 306, authentication unit 307, control unit 308, driving unit 309, and motion body 310.

As the hardware configuration, the information processing device 30 includes a motion body 310, a CPU 320, non-volatile memory 321, RAM 322, a sensor 323, an imaging device 324, a driving device 325, and a communication device 326. The motion body 310 is rotated by driving force of the driving device 325.

The CPU 320 reads and executes a program stored in the non-volatile memory 321. The program includes a program for causing the information processing device 30 to achieve the communication unit 301, the motion detection unit 302, the motion storage unit 303, the imaging unit 304, the target-device recognition unit 305, the target-device storage unit 306, the authentication unit 307, the control unit 308, the driving unit 309, and the motion body 310. Accordingly, the CPU 320 reads and executes the program stored in the non-volatile memory 321, and thereby such functions described above are achieved. That is, the communication unit 301, the motion detection unit 302, the motion storage unit 303, the imaging unit 304, the target-device recognition unit 305, the target-device storage unit 306, the authentication unit 307, the control unit 308, the driving unit 309, and the motion body 310 are achieved. The CPU 320 may be a substantive operator of the information processing device 30.

The non-volatile memory 321 stores divers programs, image information, and the like. The image information includes the above-described template image. The RAM 322 is a workspace of the CPU 320. The sensor 323 is a sensor for detecting motion of the motion body 310 (in other words, movement of an optical axis of the imaging device 324). For example, the sensor 323 may be a triaxial acceleration sensor. The imaging device 324 images an object (for example, information processing device 20) existing in front of an optical-axis direction. The driving device 325 is an actuator such as a motor and rotates the motion body 310 by control performed by the CPU 320. The communication device 326 communicates with the information processing device 20.

Note that, it is possible to cause another information processing device connecting with the information processing device 20 and the information processing device 30 through the network to perform at least one of the motion storage unit, the target-device recognition unit, the target-device storage unit, and the authentication unit from among the above-described configurations of the information processing device 20 and information processing device 30.

(1-5. Procedure of Processing Performed in Information Processing System)

(1-5-1. Procedure of Processing Performed by Information Processing Device (Wearable Device))

Next, with reference to a flowchart shown in FIG. 8, an example of a procedure of processing performed by the information processing device 20 will be explained. As a premise of the processing, the communication unit 202 finds the information processing device 30 in a communication network, and the target-device recognition unit 206 recognizes the information processing device 30.

In step S100, the imaging unit 205 starts to image the information processing device 30. Subsequently, the imaging unit 205 continues imaging. The imaging unit 205 outputs a captured image acquired though the imaging to the target-device recognition unit 206. On the other hand, the user A arbitrarily moves his head (for example, nods or jumps in the direction of the arrow a in FIG. 2). In step S110, the motion detection unit 203 detects motion of the exterior body 201 and causes the motion storage unit 204 to store motion detection information about the detection result.

In step S120, the target-device recognition unit 206 estimates motion of the motion body 310 (in other words, motion of the optical axis of the imaging unit 304) based on the captured image. Here, when the imaging unit 205 performs imaging, the exterior body 201, that is, the imaging unit 205 is moving. Accordingly, the target-device recognition unit 206 estimates the motion of the motion body 310 in consideration of motion of the imaging unit 205. The target-device recognition unit 206 causes the target-device storage unit 207 to store motion estimation information about the estimation result.

In step S130, the authentication unit 208 outputs the motion estimation information stored in the target-device storage unit 207 to the communication unit 202. The communication unit 202 transmits the motion estimation information to the information processing device 30.

In step S140, the communication unit 202 acquires authentication-result information and the motion estimation information from the information processing device 30, and outputs to the authentication unit 208.

In step S150, the authentication unit 208 determines whether mutual authentication has been succeeded. Specifically, the authentication unit 208 determines whether the information processing device 20 has been authenticated on the basis of the authentication-result information. In a case where it has been determined that the information processing device 20 was not authenticated, the authentication unit 208 goes to step S160.

In a case where it has been determined that the information processing device 20 was authenticated, the authentication unit 208 decides whether to authenticate the information processing device 30 on the basis of the motion estimation information given by the information processing device 30 and the motion detection information stored in the motion storage unit 204. Specifically, the authentication unit 208 authenticates the information processing device 30 in a case where such pieces of information are consistent with each other, and the authentication unit 208 does not authenticate the information processing device 30 in a case where such pieces of information are not consistent with each other.

In a case where the information processing device 30 is authenticated, that is, in the case where the mutual authentication is succeeded, the authentication unit 208 goes to step S170. In a case where the information processing device 30 is not authenticated, the authentication unit 208 goes to step S160.

In step S160, the information processing device 20 waits for a while, and subsequently returns to step S100. In step S170, the authentication unit 208 completes pairing with the information processing device 30. Subsequently, the communication unit 202 establishes a communication path to the information processing device 30. In addition, the control unit 210 receives diverse input operation (for example, input of a password) for operating the information processing device 30. Subsequently, the information processing device 20 ends this processing.

(1-5-2. Procedure of Processing Performed by Information Processing Device (Surveillance Camera))

Next, with reference to a flowchart shown in FIG. 9, an example of a procedure of processing performed by the information processing device 30 will be explained. As a premise of the processing, the communication unit 301 finds the information processing device 20 in a communication network, and the target-device recognition unit 305 recognizes the information processing device 20. In advance of performing processing of step S180, the information processing device 30 may output sound or flash to inform the user A of a start of the authentication. In this case, the information processing device 30 may include a speaker or a lighting device.

In step S180, the imaging unit 304 starts to image the information processing device 20. Subsequently, the imaging unit 304 continues imaging. The imaging unit 304 outputs a captured image acquired though the imaging to the target-device recognition unit 305. On the other hand, the control unit 308 randomly rotates the motion body 310 in the directions of the arrows B and C by driving the driving unit 309. In step S190, the motion detection unit 302 detects motion of the motion body 310 and causes the motion storage unit 303 to store motion detection information about the detection result.

In step S200, the target-device recognition unit 305 estimates motion of the exterior body 201 (in other words, motion of the optical axis of the imaging unit 205) on the basis of the captured image. Here, when the imaging unit 304 performs imaging, the motion body 310, that is, the imaging unit 304 is moving. Accordingly, the target-device recognition unit 305 estimates the motion of the exterior body 201 in consideration of motion of the imaging unit 304. The target-device recognition unit 305 causes the target-device storage unit 306 to store motion estimation information about the estimation result.

In step S210, the communication unit 301 receives the motion estimation information from the information processing device 20 and outputs to the authentication unit 307. The authentication unit 307 compares the motion estimation information given by the information processing device 20 with the motion detection information stored in the motion storage unit 303.

In step S220, the authentication unit 307 determines whether the motion estimation information given by the information processing device 20 and the motion detection information stored in the motion storage unit 303 are consistent with each other. In a case where it has been determined that such pieces of information are consistent with each other, the authentication unit 307 goes to step S240. In a case where it has been determined that such pieces of information are not consistent with each other, the authentication unit 307 goes to step S230.

In step S230, the authentication unit 307 generates authentication-result information indicating that the information processing device 20 is not to be authenticated, and outputs to the communication unit 301. The communication unit 301 transmits the authentication-result information to the information processing device 20. Accordingly, the authentication unit 208 of the information processing device 20 goes from step S150 to step S160. Subsequently, the authentication unit 307 returns to step S180.

In step S240, the authentication unit 307 generates authentication-result information indicating that the information processing device 20 is to be authenticated, and outputs the authentication-result information and the motion estimation information stored in the target-device storage unit 306 to the communication unit 301. The communication unit 301 transmits such pieces of information to the information processing device 20.

In step S250, the communication unit 301 waits for communication from the information processing device 20. For example, in a case where the information processing device 20 has authenticated the information processing device 30, the communication unit 301 establishes a communication path to the communication unit 202 and exchanges a password and the like. Subsequently, the information processing device 30 ends this processing.

As described above, according to the first embodiment, partner authentication is performed by not only the information processing device 30 which has received an authentication request, but also by the information processing device 20 which has issued the authentication request. Accordingly, in a case where the information processing device 30 to which the information processing device 20 has issued the authentication request is spoofed by others, the information processing device 20 can stop pairing with the information processing device 30. In addition, the information processing device 30 can authenticate the information processing device 20 existing within an imaging range of the imaging unit 304. Accordingly, in a case where the information processing device 20 is spoofed by others, the information processing device 30 can reduce a possibility of authenticating the information processing device 20. Accordingly, security is improved.

Moreover, the user A can connect (pair) the information processing device 20 operated by the user A with the information processing device 30 within view of the user A more easily. That is, a user can pair the information processing device 20 and the information processing device 30 by using a more-natural UI. Accordingly, a balance between convenience of the user and security can be achieved.

That is, according to the first embodiment, it is assured that the user A is in a position from which the user A can see the surveillance camera and the surveillance camera recognizes (images) the user A. That is, it is assured that the information processing device 20 and the information processing device 30 are in a same space. It is also assured that both the information processing device 20 and the information processing device 30 are moving. (they are not still dummies). In addition, it is also assured that motion of a motion body of another information processing device that is estimated by an information processing device and motion of a motion body detected by the another information processing device are matched.

Note that, in the above-described processing, the information processing device 30 first authenticates the information processing device 20 and after this, the information processing device 20 authenticates the information processing device 30. However, authentication order is not specifically decided.

For example, the information processing device 20 may first authenticate the information processing device 30, and then the information processing device 30 may authenticate the information processing device 20. In this case, the information processing device 20 may perform processing similar to steps S210 to S250 instead of processing in steps S130 to S160. In addition, the information processing device 30 may perform processing in steps S130 to S160 instead of processing in steps S210 to S250.

In addition, it is also possible that the information processing device 20 and the information processing device 30 authenticates each partner around a same time. In this case, the information processing device 20 may perform processing similar to steps S210 to S250 after step S140. Note that, the information processing device 20 transmits only authentication-result information to the information processing device 30 in step S240. On the other hand, the information processing device 30 may perform processing similar to FIG. 9, and the information processing device 30 transmits only authentication-result information to the information processing device 20 in step S240. In addition, in step S250, the information processing device 20 and information processing device 30 confirms that the mutual authentication is finished, and then establishes a communication path.

In a case where the information processing device 20 is a device (for example, a smartphone) other than a wearable device, the user may move the device toward the information processing device 30. For example, the user may perform operation such as waving his hand holding the smartphone or the like toward the information processing device 30.

As described above, according to the first embodiment, the information processing device 20 decides whether to authenticate the information processing device 30 on the basis of motion state information transmitted from the information processing device 30 and motion detection information stored in the motion storage unit 204. Here, since the information processing device 30 images the exterior body 201, the user A of the information processing device 20 can visually recognize the information processing device 30. In addition, the information processing device 20 can authenticate the information processing device 30 merely when the user A moves the exterior body 201. Accordingly, the information processing device 20 can connect more easily with the information processing device 30 within view of the user A.

In addition, the information processing device 20 authenticates the information processing device 30 when the motion estimation information transmitted from the information processing device 30 and the motion detection information stored in the motion storage unit 204 are consistent with each other. Accordingly, the information processing device 20 and the information processing device 30 can perform more accurate authentication.

In addition, since the information processing device 20 transmits the motion estimation information about an estimation result of motion of the motion body 310 to the information processing device 30, the information processing device 30 can perform estimation processing similar to the information processing device 20. That is, the information processing device 20 and the information processing device 30 can perform mutual authentication. Accordingly, the information processing system 10 can perform more accurate authentication.

In addition, since the information processing device 20 is a wearable device that can be carried by the user, the information processing device 20 can authenticate the information processing device 30 merely when the user moves the exterior body 201 of the wearable device. Accordingly, the information processing device 20 can connect more easily with the information processing device 30 within view of the user A.

The information processing device 30 includes the driving unit 309 configured to cause the motion body 310 to be driven. Accordingly, the information processing device 30 can move the motion body 310 by using the driving unit 309. In addition, by imaging the motion body 310, the information processing device 20 can estimate motion of the motion body 310 and can transmit motion estimation information about the estimation result to the information processing device 30. Accordingly, the information processing device 30 can authenticate the information processing device 30 more accurately.

Moreover, the imaging unit 205 is built in the exterior body 201, and the imaging unit 304 is built in the motion body 310. Accordingly, the information processing device 20 can estimate motion of the imaging unit 304 instead of the motion body 310, and the information processing device 30 can estimate the motion of the imaging unit 205 instead of exterior body 201. Accordingly, the information processing device 20 and the information processing device 30 can authenticate each partner more accurately.

(1-6. Modification of Processing Performed in Information Processing System)

In the above-described processing in item 1-5, the information processing device 20 and information processing device 30 find and recognize each partner, as a premise. However, such processing may be incorporated in the processing in item 1-5. Detailed description is explained as follows.

(1-6-1. Procedure of Processing Performed by Information Processing Device (Wearable Device))

Figure 10:
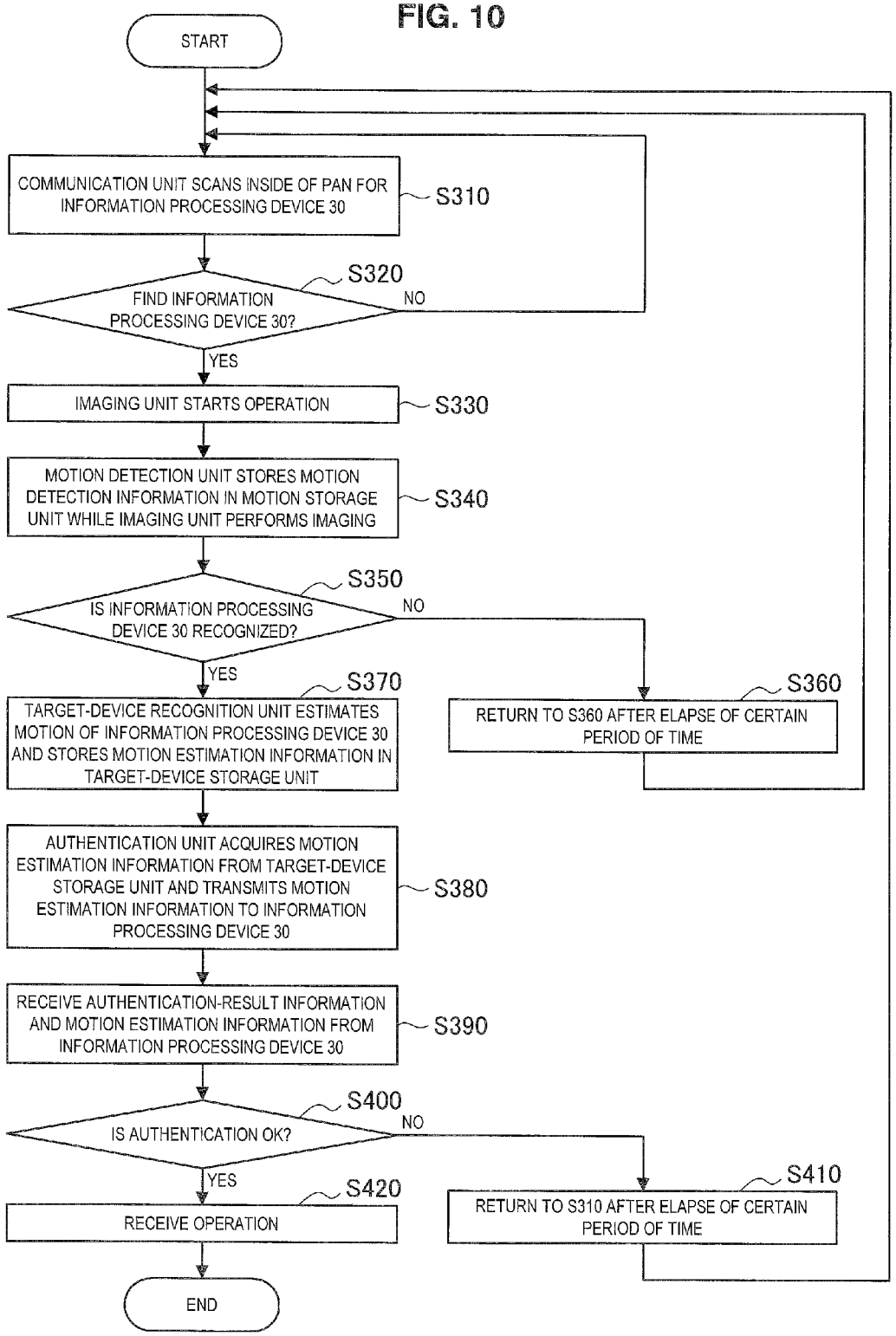
FIG. 10 is a flowchart showing a procedure of processing performed by an information processing device.

First, with reference to a flowchart shown in FIG. 10, a procedure of processing performed by the information processing device 20 will be explained. In step S310, the communication unit 202 requests the identification information from an information processing device in the communication network (PAN). That is, the communication unit 202 scans an inside of the communication network.

In step S320, the communication unit 202 searches pieces of identification information returned from respective information processing devices for a piece of identification information of the information processing device 30. In a case where there is the piece of identification information of the information processing device 30, the communication unit 202 determines that the information processing device 30 is in the communication network. That is, the communication unit 202 finds the information processing device 30. In a case where the information processing device 30 has been found, the communication unit 202 goes to step S330. On the other hand, in a case where the information processing device 30 has not been found, that is, in a case where the piece of identification information of the information processing device 30 does not exist in the pieces of identification information returned from respective information processing devices, or in a case where there is no return with identification information, the communication unit 202 returns to step S310.

Figure 8:
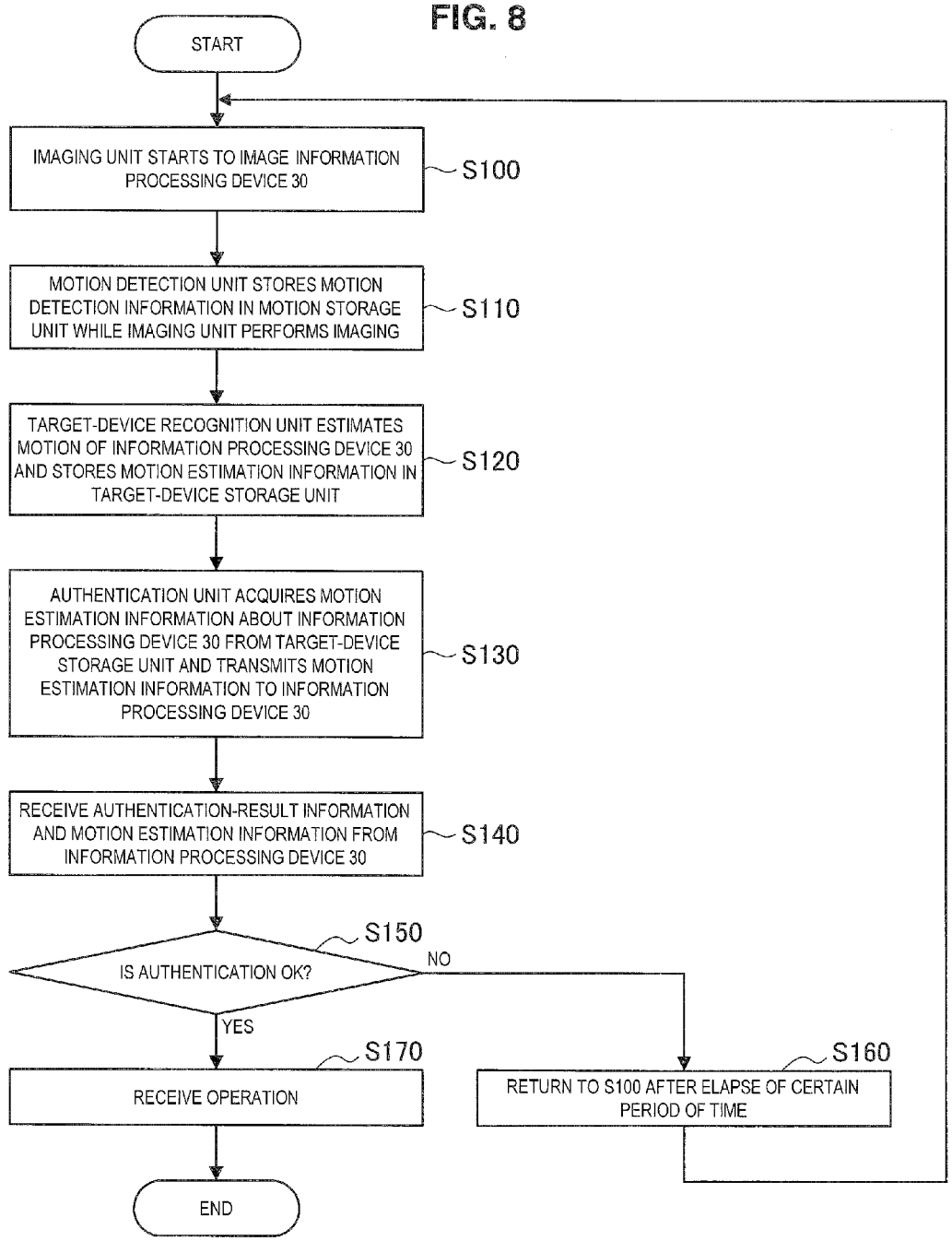
FIG. 8 is a flowchart showing a procedure of processing performed by an information processing device.

In steps S330 to S340, the information processing device 20 performs processing similar to steps S100 to S110 shown in FIG. 8.

In step S350, the target-device recognition unit 206 recognizes the information processing device 30 on the basis of the captured image. For example, the recognition is performed as described below. That is, the target-device recognition unit 206 recognizes the information processing device 30 by comparing the template image with respective object images in the captured image. In a case where the information processing device 30 has been recognized, the target-device recognition unit 206 causes the target-device storage unit 207 to store recognition-result information about the recognition, and goes to step S370. On the other hand, in a case where the information processing device 30 has not been recognized, the target-device recognition unit 206 causes the target-device storage unit 207 to store recognition-result information about the no recognition, and goes to step S360.

In step S360, the target-device recognition unit 206 waits for a while, and subsequently returns to step S310. In steps S370 to S420, the information processing device 20 performs processing similar to steps S120 to S170 shown in FIG. 8.

(1-6-2. Procedure of Processing Performed by Information Processing Device (Surveillance Camera))

Figure 11:
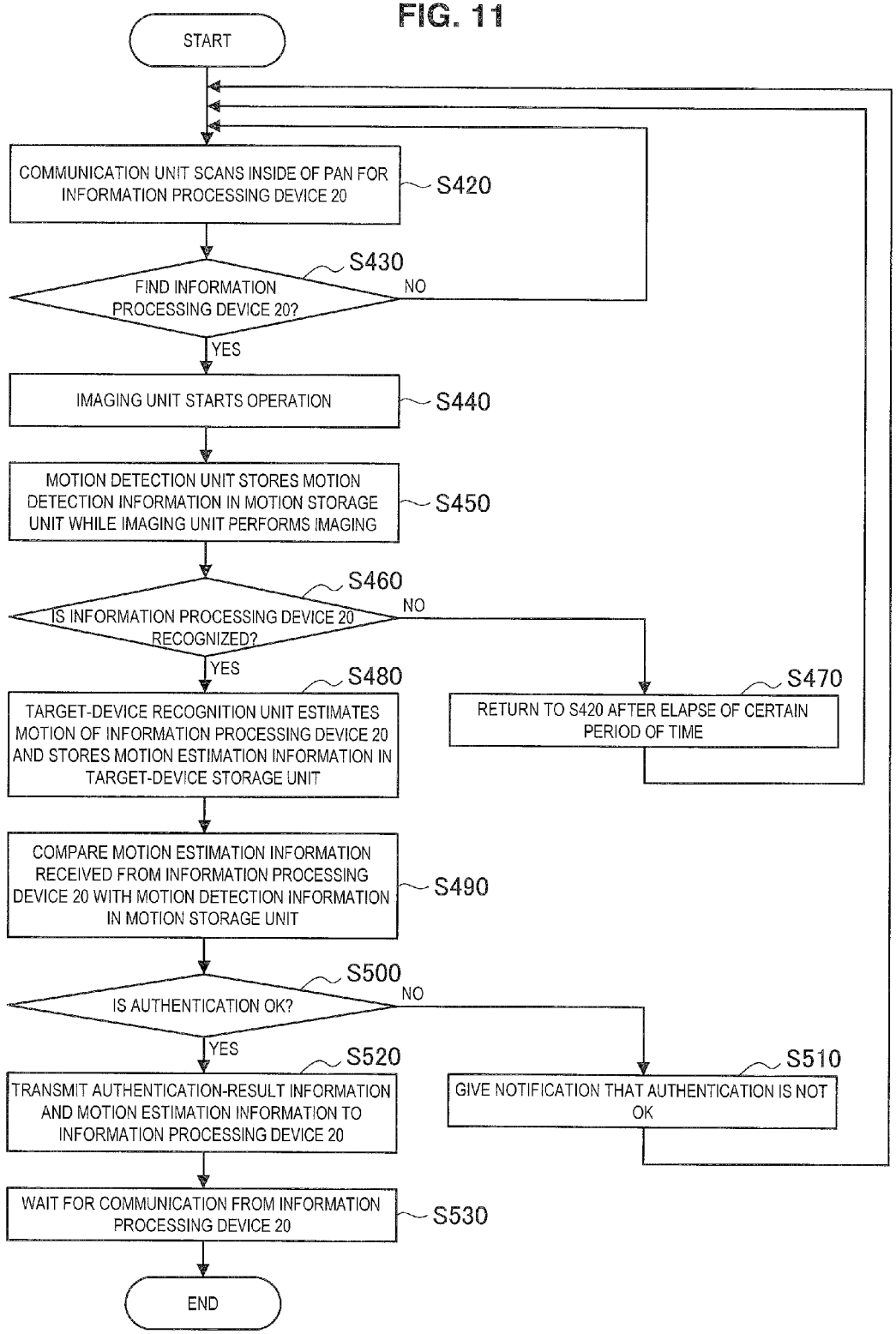
FIG. 11 is a flowchart showing a procedure of processing performed by an information processing device.

Next, with reference to a flowchart shown in FIG. 11, a procedure of processing performed by the information processing device 30 will be explained. In step S420, the communication unit 301 requests the identification information from an information processing device in the communication network (PAN). That is, the communication unit 301 scans an inside of the communication network.

In step S430, the communication unit 301 searches pieces of identification information returned from respective information processing devices for a piece of identification information of the information processing device 20. In a case where there is the piece of identification information of the information processing device 20, the communication unit 301 determines that the information processing device 20 is in the communication network. That is, the communication unit 301 finds the information processing device 20. In a case where the information processing device 20 has been found, the communication unit 301 goes to step S440. On the other hand, in a case where the piece of the information processing device 20 has not been found, that is, in a case where identification information of the information processing device 20 does not exist in the pieces of identification information returned from respective information processing devices, or in a case where there is no return with identification information, the communication unit 301 returns to step S420.

Figure 9:
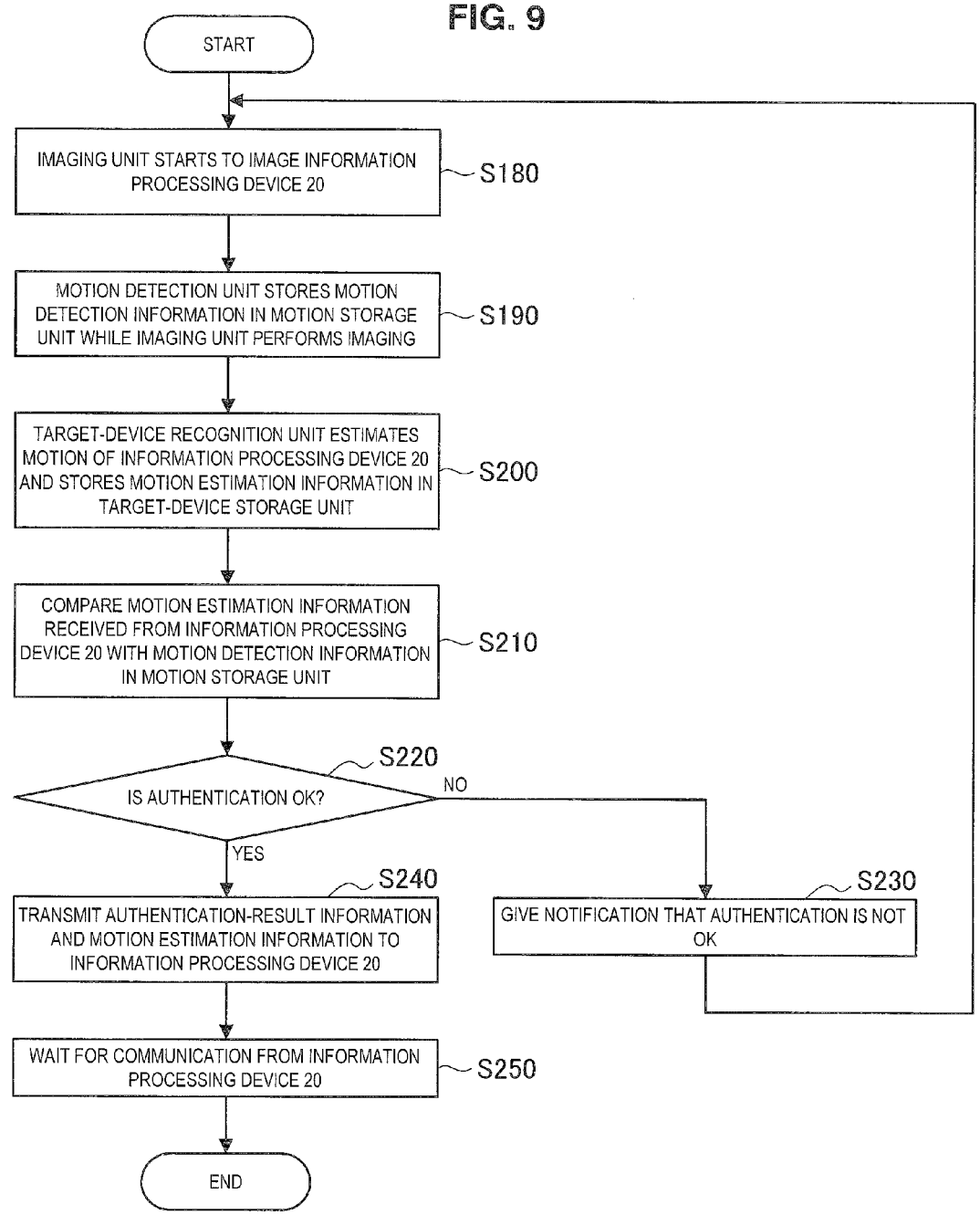
FIG. 9 is a flowchart showing a procedure of processing performed by an information processing device.

In steps S440 to S450, the information processing device 20 performs processing similar to steps S180 to S190 shown in FIG. 9.

In step S460, the target-device recognition unit 305 recognizes the information processing device 20 on the basis of the captured image. For example, the recognition is performed as described below. That is, the target-device recognition unit 305 recognizes the information processing device 20 by comparing the template image with respective object images in the captured image. In a case where the information processing device 20 has been recognized, the target-device recognition unit 305 causes the target-device storage unit 306 to store recognition-result information about the recognition, and goes to step S480. On the other hand, in a case where the information processing device 20 has not been recognized, the target-device recognition unit 305 causes the target-device storage unit 306 to store recognition-result information about the no recognition, and goes to step S470.

In step S470, the target-device recognition unit 305 waits for a while, and subsequently returns to step S420. In steps S480 to S530, the information processing device 30 performs processing similar to steps S200 to S250 shown in FIG. 9.

According to the modification, it is not necessary to drive the imaging units 205 and 304 until the communication units 202 and 301 has found each partner (information processing device 30 and information processing device 20, respectively). Accordingly, lower power consumption for the information processing device 20 and the information processing device 30 can be achieved.

<2. Second Embodiment (Combination of Wearable Device and Wearable Device)>

(2-1. Overall Configuration)

Figure 12:
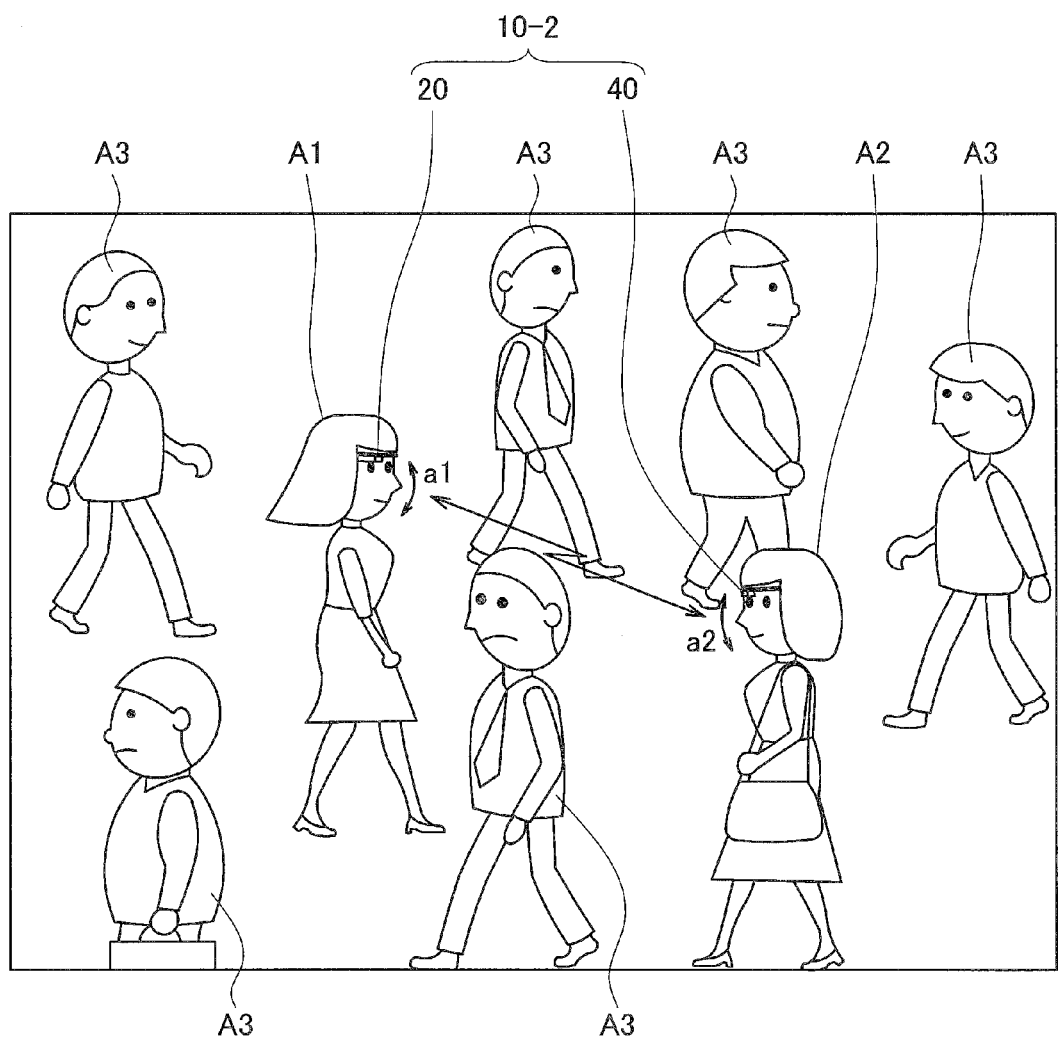
FIG. 12 is an explanatory diagram showing appearance of an information processing system according to a second embodiment of the present disclosure.

Next, with reference to FIG. 12, an overall configuration of a second embodiment will be explained. An information processing system 10-2 according to the second embodiment includes information processing devices 20 and 40. The information processing device 40 is a wearable device similar to the information processing device 20. That is, in the second embodiment, the surveillance camera is replaced by the wearable device. A user A1 wears the information processing device 20, and a user A2 wears the information processing device 40. Details will be described later. According to the second embodiment, even if a person A3 around the users A1 and A2 wears a wearable device, the wearable device of the person A3 is excluded and the information processing device 20 and information processing device 40 can be paired.

(2-2. Detailed Configuration of Information Processing Device (Wearable Device))

Figure 13:
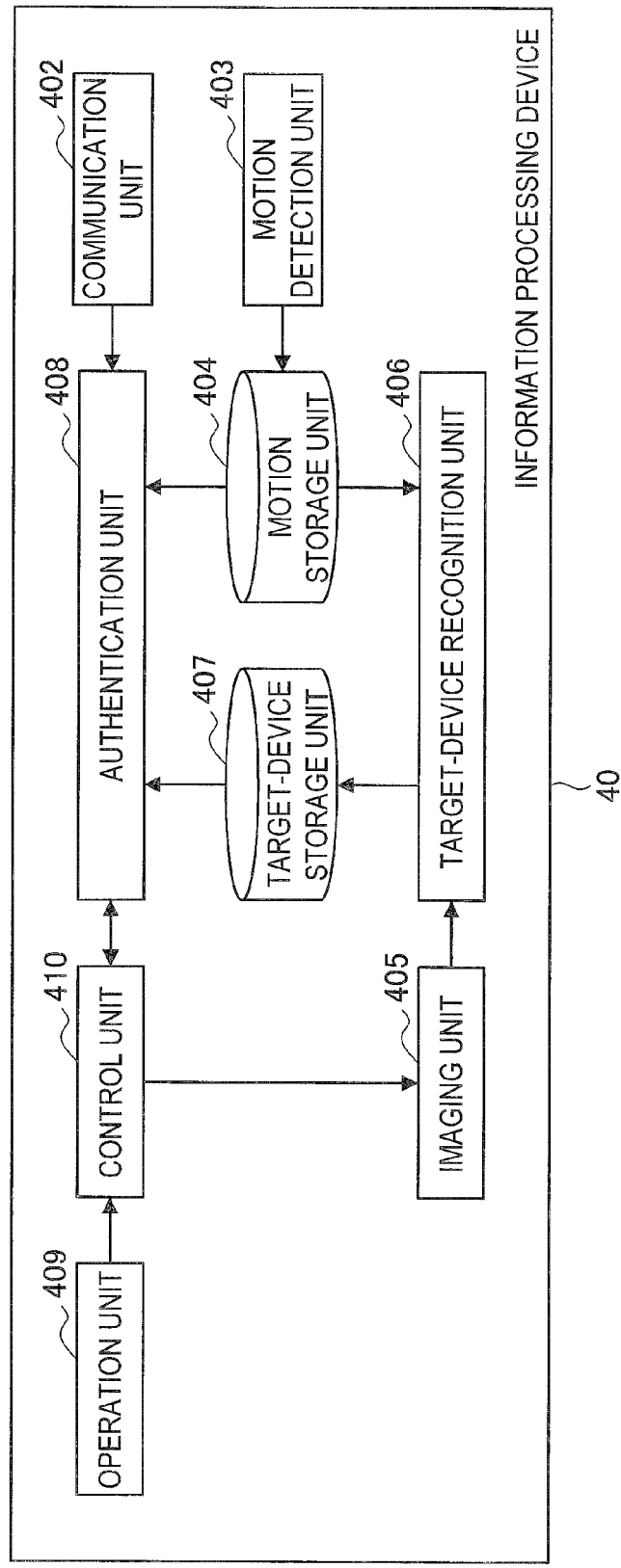
FIG. 13 is a block diagram showing a configuration of an information processing device.
Figure 14:
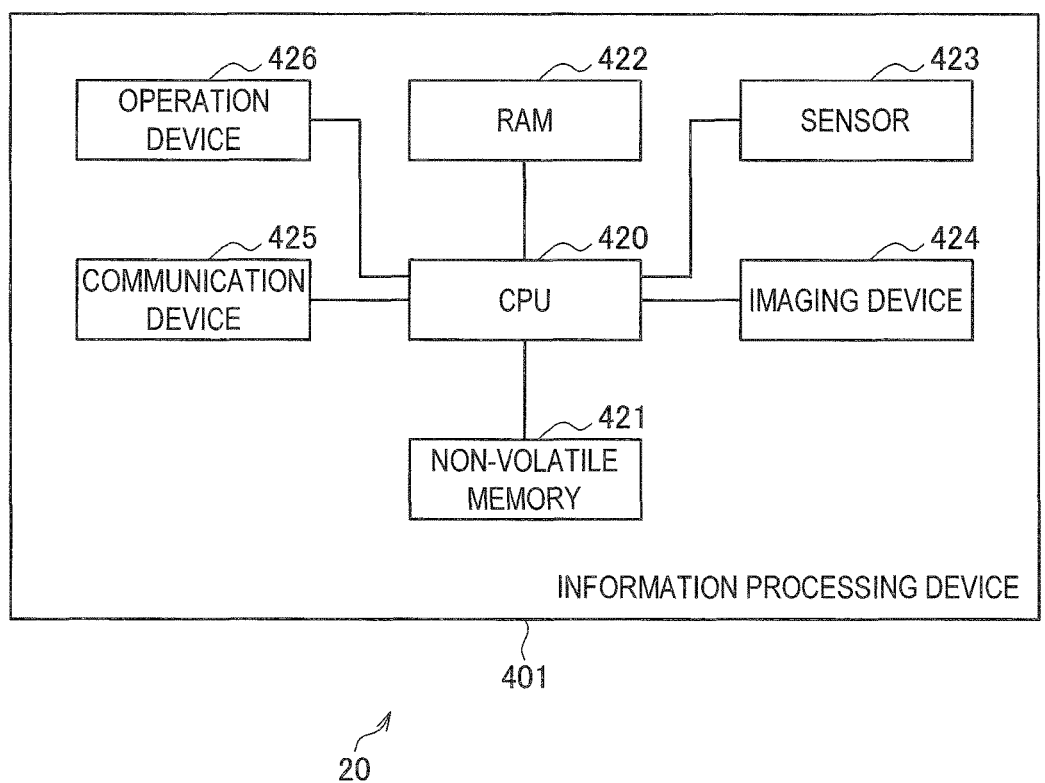
FIG. 14 is a block diagram showing a hardware configuration of an information processing device.

The information processing device 20 has a configuration similar to the first embodiment. As shown in FIGS. 13 and 14, the information processing device 40 includes an exterior body 401, a communication unit 402, a motion detection unit 403, a motion storage unit 404, an imaging unit 405, a target-device recognition unit 406, a target-device storage unit 407, an authentication unit 408, and an operation unit 409, and a control unit 410. As the hardware configuration, the information processing device 40 includes an exterior body 401, a CPU 420, non-volatile memory 421, RAM 422, a sensor 423, an imaging device 424, a communication device 425, and an operation device 426. Since such configuration is similar to the information processing device 20, an explanation is omitted. They are also similar in a point that a part of such configuration may be performed by another information processing device.

(2-3. Procedure of Processing Performed in Information Processing System)

(2-3-1. Procedure of Processing Performed by Information Processing Device (One Wearable Device))

Next, with reference to a flowchart shown in FIG. 8, a procedure of processing performed by the information processing device 20 will be explained. As a premise, the information processing device 20 and the information processing device 40 have found and recognized each other.

In step S100, the imaging unit 205 starts to image the information processing device 40. Subsequently, the imaging unit 205 continues imaging. The imaging unit 205 outputs a captured image acquired though the imaging to the target-device recognition unit 206. On the other hand, the user A1 arbitrarily moves his head (for example, nods or jumps in the direction of the arrow A1 in FIG. 12). In step S110, the motion detection unit 203 detects motion of the exterior body 201 and causes the motion storage unit 204 to store motion detection information about the detection result.

In step S120, the target-device recognition unit 206 estimates motion of the exterior body 401 (in other words, motion of the optical axis of the imaging unit 405) on the basis of the captured image. Here, when the imaging unit 205 performs imaging, the exterior body 201, that is, the imaging unit 205 is moving. Accordingly, the target-device recognition unit 206 estimates the motion of the exterior body 401 in consideration of motion of the imaging unit 205. The target-device recognition unit 206 causes the target-device storage unit 207 to store motion estimation information about the estimation result. Processing after step S130 is similar to the first embodiment.

(2-3-2. Procedure of Processing Performed by Information Processing Device (Another Wearable Device))

Next, with reference to a flowchart shown in FIG. 9, an example of a procedure of processing performed by the information processing device 40 will be explained.

In step S180, the imaging unit 405 starts to image the information processing device 20. Subsequently, the imaging unit 405 continues imaging. The imaging unit 405 outputs a captured image acquired though the imaging to the target-device recognition unit 406. On the other hand, the user A2 arbitrarily moves his head (for example, nods or jumps in the direction of the arrow A2 in FIG. 12). In step S190, the motion detection unit 403 detects motion of the exterior body 401 and causes the motion storage unit 404 to store motion detection information about the detection result.

In step S200, the target-device recognition unit 406 estimates motion of the exterior body 201 (in other words, motion of the optical axis of the imaging unit 205) on the basis of the captured image. Here, when the imaging unit 405 performs imaging, the exterior body 401, that is, the imaging unit 405 is moving. Accordingly, the target-device recognition unit 406 estimates the motion of the exterior body 201 in consideration of motion of the imaging unit 405. The target-device recognition unit 406 causes the target-device storage unit 407 to store motion estimation information about the estimation result. Processing after step S210 is similar to the first embodiment.

As described above, according to the second embodiment, the following effect can be obtained in addition to an effect similar to the first embodiment. That is, according to the second embodiment, partner authentication is performed by not only the information processing device 40 which has received an authentication request, but also by the information processing device 20 which has issued the authentication request. Accordingly, in a case where the information processing device 40 to which the information processing device 20 has issued the authentication request is spoofed by others, the information processing device 20 can stop pairing with the information processing device 40. Accordingly, security is improved. Moreover, the users A1 and A2 can respectively connect with (pair) the information processing device 20 and information processing device 40 within view of each other more easily.

In addition, in the second embodiment, the wearable device of the another person A3 is excluded even if the another person A3 wears the wearable device having functions similar to the information processing device 20 and the information processing device 40. For example, the wearable device of the another person A3 estimates motion of the exterior body 201 of the information processing device 20 and transmits motion estimation information about the estimation to the information processing device 20. In this case, the information processing device 20 determines that its own motion detection information and motion estimation information is consistent with each other. However, the information processing device 20 transmits motion estimation information acquired by estimating motion of the information processing device 40. Accordingly, even if the motion estimation information is transmitted to the wearable device of the another person A3, the wearable device of the another person A3 can exclude the motion estimation information because its own motion detection information and the motion estimation information are not consistent with each other. That is, the wearable device of the another person A3 is excluded from the pair of the information processing device 20 and the information processing device 40.

Needless to say, authentication order is not specifically decided also in the second embodiment. In addition, the modification of the first embodiment can be applied to the second embodiment. Moreover, the information processing device 20 and information processing device 40 are not limited to the wearable device in a way similar to the first embodiment. Other examples of the information processing devices 20 and 40 are similar to the first embodiment.

In a case where at least one of the information processing device 20 and the information processing device 40 is a device (for example, a smartphone) other than a wearable device, the user of the smartphone may perform operation such as waving his hand holding the smartphone toward a wearable device of another user.

Note that, the first and second embodiments may achieve any of the effects indicated in this specification or other effects.

It should be understood by those skilled in the art that various modifications, combinations, sub-combinations and alterations may occur depending on design requirements and other factors insofar as they are within the scope of the appended claims or the equivalents thereof.

For example, in the above-described embodiments, the exterior bodies such as the wearable devices and the substantially-spherical rotating body are shown as the motion bodies. However, the motion bodies are not limited thereto. That is, the motion bodies may be a lighting device that lights in a random lighting pattern (visible light, infrared light, and any kinds of light can be used), a display device that displays a certain image (for example, a bar code image) in a random pattern, and the like.

Additionally, the present technology may also be configured as below:

(1) An information processing device including:
a first motion body that is a target for imaging performed by another information processing device;
a detection unit configured to detect motion of the first motion body; and
an authentication unit configured to decide whether to authenticate the another information processing device on the basis of a motion state of the first motion body that has been estimated by the another information processing device on the basis of a captured image acquired through the imaging and a motion state of the first motion body that has been detected by the detection unit.

(2) The information processing device according to (1),
wherein the authentication unit authenticates the another information processing device in a case where the motion state of the first motion body that has been estimated by the another information processing device and the motion state of the first motion body that has been detected by the detection unit are consistent with each other.

(3) The information processing device according to (1) or (2), further including:
an imaging unit configured to image a second motion body included in the another information processing device; and
an estimation unit configured to estimate a motion state of the second motion body on the basis of the captured image acquired by the imaging unit through the imaging,
wherein the authentication unit performs control in a manner that motion estimation information is transmitted to the another information processing device, the motion estimation information relating to the motion state of the second motion body estimated by the estimation unit.

(4) The information processing device according to any one of (1) to (3),
wherein the information processing device is capable of being carried by a user, and
wherein the first motion body is an exterior body of the information processing device.

(5) The information processing device according to any one of (1) to (3), further including:
a driving unit configured to cause the first motion body to be driven.

(6) The information processing device according to any one of (3) to (5),
wherein the imaging unit is built in the first motion body.

(7) An information processing device including:
an imaging unit configured to image a second motion body included in another information processing device;
an estimation unit configured to estimate a motion state of the second motion body on the basis of a captured image acquired by the imaging unit through the imaging; and
an authentication unit configured to perform control in a manner that motion estimation information is transmitted to the another information processing device, the motion estimation information relating to the motion state of the second motion body estimated by the estimation unit.

(8) The information processing device according to (7), further including:
a first motion body that is a target for imaging performed by the another information processing device; and
a detection unit configured to detect motion of the first motion body,
wherein the authentication unit decides whether to authenticate the another information processing device on the basis of a motion state of the first motion body that has been estimated by the another information processing device on the basis of the captured image acquired through the imaging and a motion state of the first motion body that has been detected by the detection unit.

(9) The information processing device according to (8),
wherein the authentication unit authenticates the another information processing device in a case where the motion state of the first motion body that has been estimated by the another information processing device and the motion state of the first motion body that has been detected by the detection unit are consistent with each other.

(10) The information processing device according to (8) or (9),
wherein the information processing device is capable of being carried by a user, and
wherein the first motion body is an exterior body of the information processing device.

(11) The information processing device according to (8) or (9), further including:
a driving unit configured to cause the first motion body to be driven.

(12) The information processing device according to any one of (8) to (11),
wherein the imaging unit is built in the first motion body.

(13) An information processing method including:
detecting motion of a first motion body that is a target for imaging performed by another information processing device; and
deciding whether to authenticate the another information processing device on the basis of a motion state of the first motion body that has been estimated by the another information processing device on the basis of a captured image acquired through the imaging and a detected motion state of the first motion body.

(14) The information processing method according to (13), further including:
imaging a second motion body included in the another information processing device;

estimating a motion state of the second motion body on the basis of the captured image acquired through the imaging; and performing control in a manner that motion estimation information is transmitted to the another information processing device, the motion estimation information relating to the estimated motion state of the second motion body.

(15) An information processing method including:

imaging a second motion body included in another information processing device;

estimating a motion state of the second motion body on the basis of a captured image acquired through the imaging; and performing control in a manner that motion estimation information is transmitted to the another information processing device, the motion estimation information relating to the estimated motion state of the second motion body.

(16) The information processing method according to (15), further including:

detecting motion of a first motion body that is a target for imaging performed by another information processing device; and deciding whether to authenticate the another information processing device on the basis of a motion state of the first motion body that has been estimated by the another information processing device on the basis of the captured image acquired through the imaging and a detected motion state of the first motion body.

(17) A program for causing a computer to execute:

a detection function of detecting motion of a first motion body that is a target for imaging performed by another information processing device; and an authentication function of deciding whether to authenticate the another information processing device on the basis of a motion state of the first motion body that has been estimated by the another information processing device on the basis of a captured image acquired through the imaging and a detected motion state of the first motion body.

(18) The program, according to (17) for causing a computer to execute:

an imaging function of imaging a second motion body included in the another information processing device; and an estimation function of estimating a motion state of the second motion body on the basis of the captured image acquired through the imaging, wherein the authentication function performs control in a manner that motion estimation information is transmitted to the another information processing device, the motion estimation information relating to the estimated motion state of the second motion body.

(19) A program for causing a computer to execute:

an imaging function of imaging a second motion body included in another information processing device;

an estimation function of estimating a motion state of the second motion body on the basis of a captured image acquired through the imaging; and an authentication function of performing control in a manner that motion estimation information is transmitted to the another information processing device, the motion estimation information relating to the estimated motion state of the second motion body.

(20) The program, according to (19) for causing a computer to execute:

a detecting function of detecting motion of a first motion body that is a target for imaging performed by another information processing device, wherein the authentication function decides whether to authenticate the another information processing device on the basis of a motion state of the first motion body that has been estimated by the another information processing device on the basis of the captured image acquired through the imaging and a detected motion state of the first motion body.

(21) An information processing system including:

a plurality of information processing devices including a motion body that is a target for imaging performed by another information processing device, a detection unit configured to detect a motion state of the motion body, an imaging unit configured to image a motion body included in the another information processing device, an estimation unit configured to estimate a motion state of the motion body included in the another information processing device on the basis of the captured image acquired by the imaging unit through the imaging, and an authentication unit configured to decide whether to authenticate the another information processing device on the basis of motion estimation information transmitted form the another information processing device and motion detection information relating to a detection result from the detection unit, while performing control in a manner that motion estimation information is transmitted to the another information processing device, the motion estimation information relating to the estimation result from the estimation unit.

What is claimed is:

1. A first information processing device, comprising:
a first motion body that is a target for imaging by a second information processing device; and
one or more processors configured to:
  request identification information from the second information processing device;
  identify the second information processing device based on the identification information received from the second information processing device and stored identification information;
  detect a first motion state of the first motion body based on the identification;
  calculate a first movement locus of a determined point on the first motion body based on the first motion state;
  acquire a first information comprising a second movement locus of the determined point on the first motion body from the second information processing device, wherein the second movement locus is estimated by the second information processing device based on a first captured image, acquired through the imaging, of the first motion body; and
  authenticate the second information processing device based on the first movement locus and the second movement locus.

2. The first information processing device according to claim 1, wherein the one or more processors are further configured to:
authenticate the second information processing device based on a determination that the second movement locus of the first motion body that has been estimated by the second information processing device and the first movement locus of the first motion body are consistent with each other.

3. The first information processing device according to claim 1, further comprising:

an imaging unit configured to image a second motion body included in the second information processing device, and wherein the one or more processors are further configured to:
estimate, based on the identification of the second information processing device, a second motion state of the second motion body, wherein the second motion state of the second motion body is estimated based on a second captured image of the second motion body acquired by the imaging unit through the imaging, and
transmit a second information comprising the second motion state to the second information processing device.

4. The first information processing device according to claim 1,
wherein the first information processing device is carried by a user, and wherein the first motion body is an exterior body of the first information processing device.

5. The first information processing device according to claim 1, further comprising:
an actuator configured to drive the first motion body.

6. The first information processing device according to claim 3, wherein the imaging unit is built in the first motion body.

7. A first information processing device, comprising:
an imaging unit configured to image a first motion body included in a second information processing device; and
one or more processors configured to:
request identification information from the second information processing device;
identify the second information processing device based on the identification information received from the second information processing device and stored identification information;
estimate, based on the identification, a first motion state of the first motion body,
wherein the first motion state is estimated based on a first captured image, acquired by the imaging unit through the imaging, of the first motion body;
calculate a first movement locus of a determined point on the first motion body based on the first motion state; and
transmit a first information comprising the first movement locus to the second information processing device;
wherein the second information processing device is configured to:
calculate a second movement locus of the determined point on the first motion body; and
authenticate the first information processing device based on the first movement locus and the second movement locus.

8. The first information processing device according to claim 7, further comprising:
a second motion body that is a target for imaging by the second information processing device, and
wherein the one or more processors are further configured to:
detect a second motion state of the second motion body,
acquire a second information comprising a third motion state of the second motion body from the second information processing device, wherein the third motion state is estimated by the second information processing device based on a second captured image, acquired through the imaging, of the second motion body; and
authenticate the second information processing device based on the first motion state and the third motion state.

9. The first information processing device according to claim 8,
wherein the one or more processors are further configured to authenticate the second information processing device based on a determination that the third motion state of the second motion body that has been estimated by the second information processing device and the second motion state of the second motion body are consistent with each other.

10. The first information processing device according to claim 8, wherein the first information processing device is carried by a user, and wherein the second motion body is an exterior body of the first information processing device.

11. The first information processing device according to claim 8, further comprising: an actuator configured to drive the second motion body.

12. The first information processing device according to claim 8, wherein the imaging unit is built in the second motion body.

13. An information processing method, comprising:
in a first information processing device:
requesting identification information from a second information processing device;
identifying the second information processing device based on the identification information received from the second information processing device and stored identification information;
detecting, based on the identification, a first motion state of a first motion body that is a target for imaging by the second information processing device;
calculating a first movement locus of a determined point on the first motion body based on the first motion state;
acquiring a first information comprising a second movement locus of the determined point on the first motion body from the second information processing device, wherein the second movement locus is estimated by the second information processing device based on a first captured image, acquired through the imaging, of the first motion body; and
authenticating the second information processing device based on the first movement locus and the second movement locus.

14. The information processing method according to claim 13, further comprising:
imaging, based on the identification of the second information processing device, a second motion body included in the second information processing device;
estimating a second motion state of the second motion body based on a second captured image acquired through the imaging; and
transmitting a second information comprising the second motion state to the second information processing device.

15. An information processing method, comprising:
in a first information processing device configured to:
requesting identification information from a second information processing device;
identifying the second information processing device based on the identification information received from the second information processing device and stored identification information;
imaging, based on the identification, a first motion body included in the second information processing device;
estimating a first motion state of the first motion body based on a first captured image acquired through the imaging;
calculating a first movement locus of a determined point on the first motion body based on the first motion state; and
transmitting a first information comprising the first motion state to the second information processing device,
wherein the second information processing device is configured to:
  calculate a second movement locus of the determined point on the first motion body; and
  authenticate the first information processing device based on the first movement locus and the second movement locus.

16. The information processing method according to claim 15, further comprising:
detecting a second motion state of a second motion body that is a target for imaging by the second information processing device;
acquiring a second information comprising a third motion state of the second motion body from the second information processing device, wherein the third motion state is estimated by the second information processing device based on a second captured image, acquired through the imaging, of the second motion body; and
authenticating the second information processing device based on the first motion state and the third motion state.

* * * * *